UNITED STATES PATENT OFFICE.

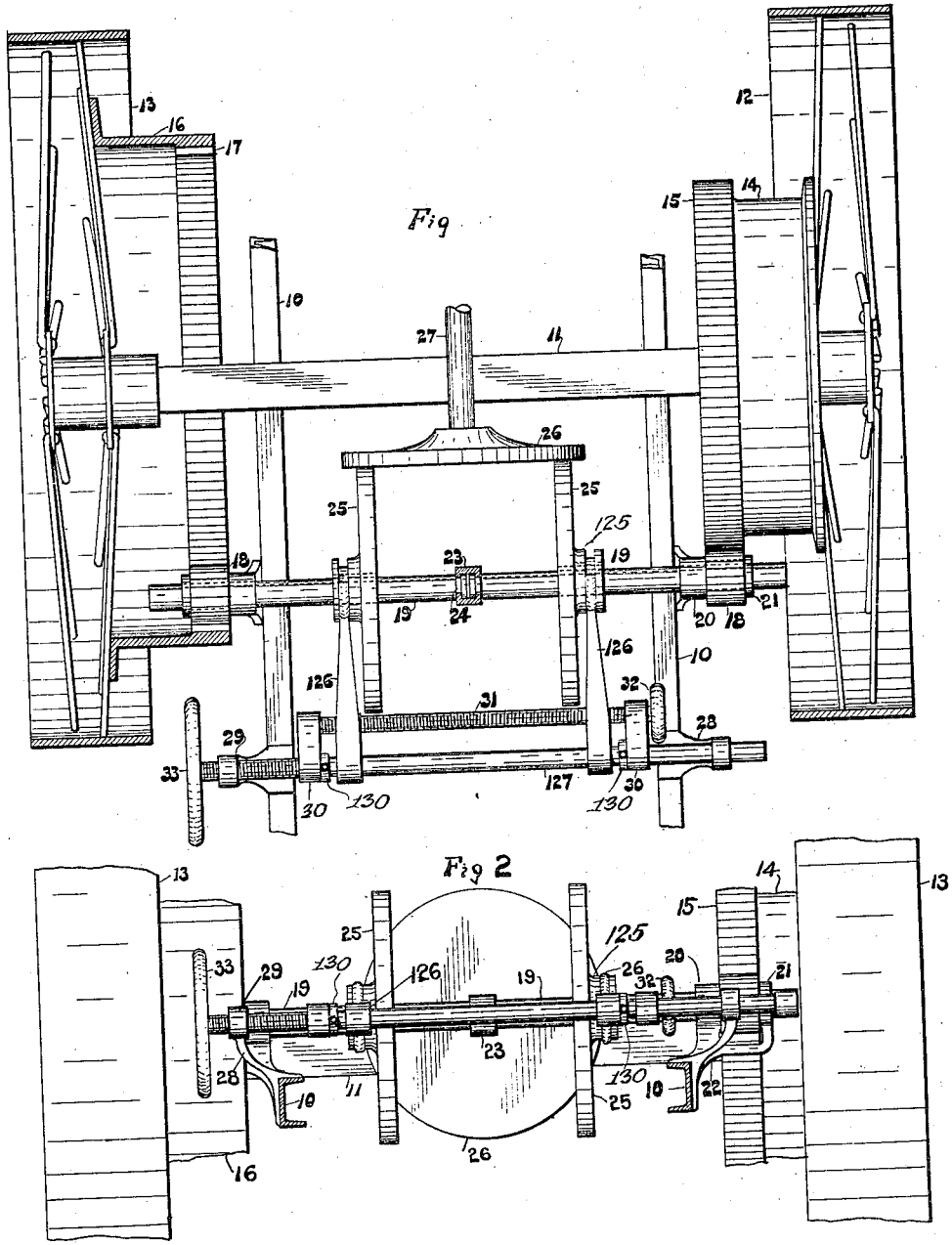

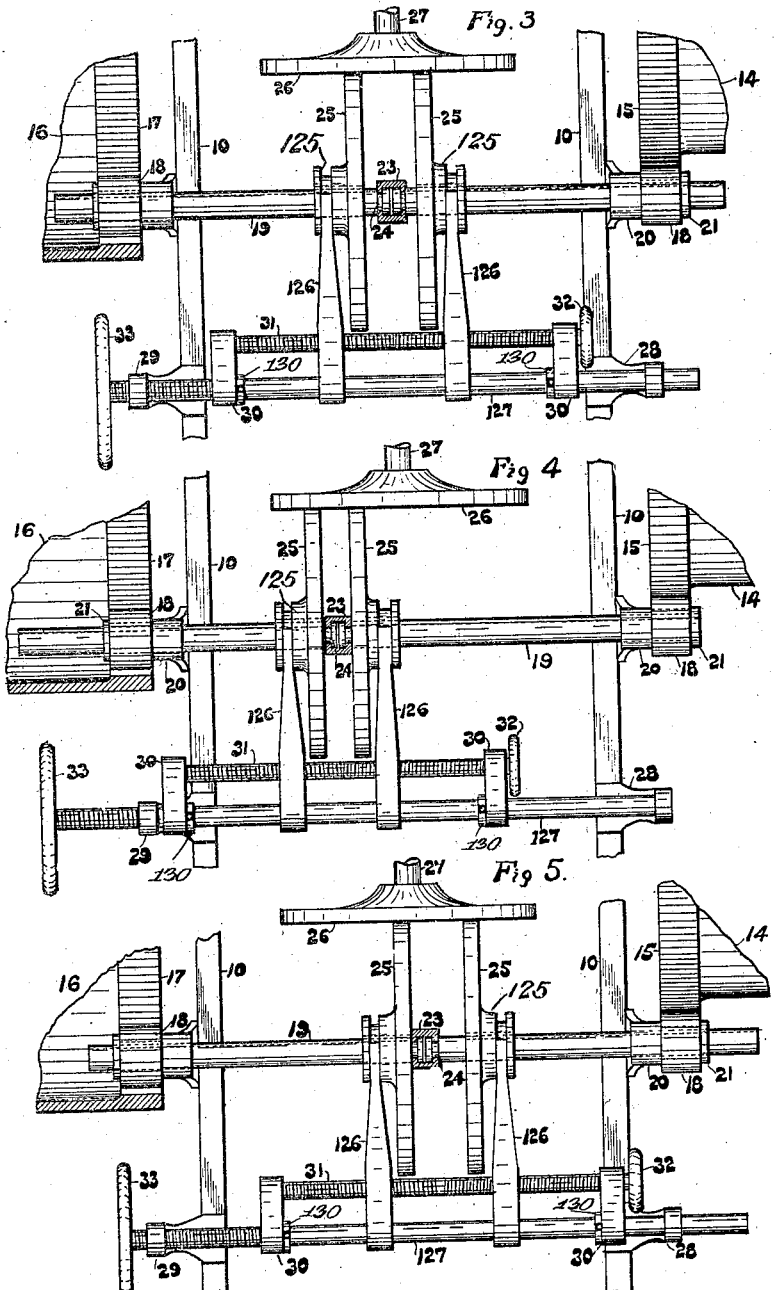

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

STEERABLE TRACTION DRIVE MECHANISM.

1,124,951.  Specification of Letters Patent.  Patented Jan. 12, 1915.

Application filed December 9, 1912. Serial No. 735,738.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Steerable Traction Drive Mechanism; and we do hereby declare that the following is a full, clear, and exact description thereof, reference being had to the accompanying drawings, in which like letters refer to like parts.

The object of this invention is to provide a tractor, traction engine, automobile or like vehicle so as to steer through or by utilizing the drive wheels or the wheels to which power is transmitted for propelling the vehicle, and thus simplify the machine. It is particularly adapted for use in connection with tractors and traction engines.

The chief feature of the invention consists in providing means for varying the relative speeds of the two drive wheels and thus cause the machine to turn or steer. Said means enables one to drive the drive wheels at a uniform speed for straight ahead, or to vary the speeds thereof to any degree desired for turning or steering as sharply as may be desired.

The nature of the invention will be understood from the accompanying drawings and the following description and claims.

In the drawings, Figure 1 is a view of a portion of a traction engine showing the parts in plan view and the two drive wheels in horizontal section and parts broken away and the transmission mechanism in condition for traveling straight ahead. Fig. 2 is a rear elevation of what is shown in Fig. 1 with the drive wheels partly broken away. Fig. 3 shows the rear half of Fig. 1 with the parts altered for changing the speed of both drive wheels alike, as when going straight ahead. Fig. 4 is a similar view showing the position of the parts when the machine is turning to the right. Fig. 5 is a similar view with the parts in position for turning to the left.

There is shown herein the side bars 10 of the chassis or frame of a traction engine or automobile, and an axle 11 mounted thereon and carrying drive wheels 12 and 13 on the ends thereof. These drive wheels operate loosely on the axle 11 and the wheel 12 has extending inward from it a drum or frame 14 carrying an external gear 15, while the other drive wheel 13 has a similar drum 16 and an internal gear 17 therein. The drum 16 is of greater diameter than the drum 14 and likewise the internal gear 17 is of greater diameter than the external gear 15.

The wheels 12 and 13 are driven by pinions 18 keyed or slidably mounted upon the driving shafts 19 between collars 20 and 21, see Fig. 2, extending from a bracket 22 secured to the chassis or frame 10. This construction is such that the shafts may be moved longitudinally, but the pinions cannot, and yet power will be transmitted to the shafts and the pinions, and the pinions always be held in the same position with relation to the gears 15 and 17.

The shafts 19 are in alinement with each other and at their outer ends are mounted in the collars 20 and 21. At their inner ends they are coupled together by loose coupling 23 not merely to hold them together, but permit their independent rotation. The coupling 23 is a housing with laterally inwardly extending flanges or portions which project loosely into peripheral grooves 24 in the shafts near their ends. These shafts 19 are driven by friction disks or wheels 25, one being mounted on each shaft and the two being parallel with each other and both adapted to be driven by one friction disk 26 which is secured on a driving shaft 27 which is driven by an engine or other source of power. Since both wheels 25 are driven by the same driving disk, and one driven disk is on each side of the center of the driving disk, therefore, they will rotate in opposite directions and for that reason the pinions 18 are arranged to drive an external gear on one drive wheel and an internal gear on the other drive wheel. This causes the two drive wheels 12 and 13 to move or travel in the same direction.

The speed of the vehicle is changed by a grooved hub 125 on each driven friction disk 25 which is engaged by the yoked end of an arm 126 which is pivoted or slidably mounted upon a rod 127 mounted in brackets 28 and 29. Said rod 127 has two arms 30 loosely mounted thereon and held from lateral movement on said rod by collars 130 and they extend inward and carry a reversely threaded screw rod 31 having a wheel 32 at one end whereby it is operated and it extends through the two arms 126 and is threaded in said arms. Therefore, by turning the screw rod 31 in one direction, the arms 126 will be moved toward each other and the driven disks will move toward the center of the driving disk equally and the speed of the vehicle correspondingly diminished. A reverse operation of the screw rod 31 will produce the opposite result and move said friction disks 25 outward to their high speed positions, as shown in Figs. 1 and 2.

The foregoing mechanism drives the vehicle straight ahead and at any desired speed and any little inequalities in operation are provided for by the shafts 19 being independent of each other.

To change the relative speed of the drive wheels 12 and 13, the rod 127 is threaded at one end and operates in a threaded bearing in the bracket 29 and has a hand wheel 33 secured to it so that when the hand wheel is turned said bracket 29 will shift the screw rod 31, the arms 126 and both friction disks 25 as a group or whole, in one direction or the other, and in that manner the position of the two friction disks 25 relative to the center of the drive disk 26 can be varied. Assuming the friction disks 25 to be somewhat closer together than in Fig. 1, but equidistant from the center of the disk 26, by turning the hand wheel 33 to the left, the friction disks 25 will shift to the left so that the right-hand disk will be moved closer to the center of the driven disk 26, and the left-hand disk be moved farther away from the center of the friction disk 26. Then the right-hand disk will rotate more slowly than the left-hand disk and the same will be true of the drive wheels, the wheel 12 traveling more slowly than the wheel 13, and that will steer the wheel or cause it to turn and the sharpness of the turn to the right, as shown in Fig. 4, will depend upon the extent to which the hand wheel 33 is turned.

On the other hand, if the hand wheel 33 should be turned to the right, it will shift the friction disks 25 to the right and thereby cause the left-hand disk 25 and wheel 13 to travel at a slower speed than the right-hand wheel and then the machine will turn or be steered to the left, as shown in Fig. 5. Therefore, the wheel 33 is in the nature of a steering wheel as well as a speed changing wheel, changing the speed of the two drive wheels 12 and 13 with respect to each other and thereby steering the machine, while the hand wheel 32 is only a speed changing wheel. It is observed that the speeds of the drive wheels 12 and 13 and the shafts 19 vary in inverse ratio, that is, one will be increased in the same proportion as the other is decreased so that the uniform relationship in the travel of the wheels will be maintained.

The shafts 19 are slidable in bearings 20 and 21 to permit a friction wheel, if desired, to be shifted past the center of driving disk 26, for turning, as shown in Fig. 4. In that position, the right-hand shaft 19 is reversed. Such reversal is, however, not necessary, except when a very sharp turn is desired.

We claim as our invention:

1. A vehicle including a pair of shafts in alinement with each other, means for driving the same in opposite directions, a pair of wheels to be driven and which are in alinement with each other, a drum extending inwardly from each wheel, an internal gear on one of said drums, an external gear on the other drum, and a pinion on each shaft meshing with said gears.

2. A vehicle including a frame, a pair of shafts in alinement with each other, a driven friction disk splined on each shaft, a driving friction disk for operating said driven friction disks simultaneously in opposite directions, a rod mounted upon said frame so that it may be reciprocated parallel with said shafts, arms slidably pivoted at one end on said rod and operably connected with said driven disks, and a reversely threaded rod mounted in connection with said first-mentioned rod and extending through and threaded in said arms whereby the driven disks may be shifted toward or away from each other or both in the same direction, as desired.

3. A vehicle including a frame, a traction wheel at each side of the frame, an internal gear secured to one traction wheel, an external gear secured to the other traction wheel, a pair of shafts in alinement with each other, a pair of bearings secured at each side of the frame in which each shaft is mounted and in which the shafts are longitudinally slidable, a pinion splined on each shaft between said bearings for engaging said gears, a friction driven disk splined on each shaft, a driving friction disk engaging both friction driven disks, means for moving the friction disks toward each other on said shafts, and means for simultaneously shifting both of said shafts and friction disks laterally, as desired.

In witness whereof, we have hereunto affixed our signatures in the presence of the witnesses herein named.

FRANK I. REMY.
BENJAMIN P. REMY.
ARTHUR BERGER.

Witnesses:
H. B. POLAND,
RUTH I. MILLER.